Jan. 29, 1935. J. ERRANTE 1,989,089
COATED ARTICLE AND PROCESS OF MAKING SAME
Filed Aug. 3, 1933

INVENTOR:
John Errante.
BY
ATTORNEY.

Patented Jan. 29, 1935

1,989,089

UNITED STATES PATENT OFFICE 1,989,089

COATED ARTICLE AND PROCESS OF MAKING SAME

John Errante, Vigus, Mo.

Application August 3, 1933, Serial No. 683,503

4 Claims. (Cl. 41—35)

My invention relates to imitation coated articles and process of making same.

The object of the invention resides in the application to the surface of vases, baskets, glasses, panels, boards, rods, bottles and other useful articles too numerous to mention, of a coating of contractable adhesive composition which will firmly adhere to smooth surfaces, and, which can be provided with surface design in true imitation or natural tree bark, the process being carried out either by hand or machine operation.

Another feature of the invention resides in the application to such surface coating of an additional feature, such for instance as natural or artificial limb stumps composition surface coated and surface designed in imitation of sawed-off limbs for adding to the natural beauty of the completed article.

Such composition, after having been applied to a base form and provided with the surface design in imitation of natural tree bark and lump stumps, is then dried by controlled heat, thus predetermining the tones of shades of color to be produced on the surface of the composition.

The process is easy to carry out, inexpensive and productive of pleasing results in the imitation of natural tree bark of any class desired.

According to the present invention, a product is obtained as a result of the novel process hereindescribed, which exhibits the finest and most delicate tones of surface shades of colors, which are true to nature in every respect.

My invention will be best understood from a consideration of the following detailed description taken in connection with the accompanying drawing, with the understanding that the invention is not confined to any strict conformity with the surface design shown in the drawing, as the composition coating can be applied as a surface design to any kind of an article, solid, or hollow, inasmuch as its use is unlimited.

Figure 1:
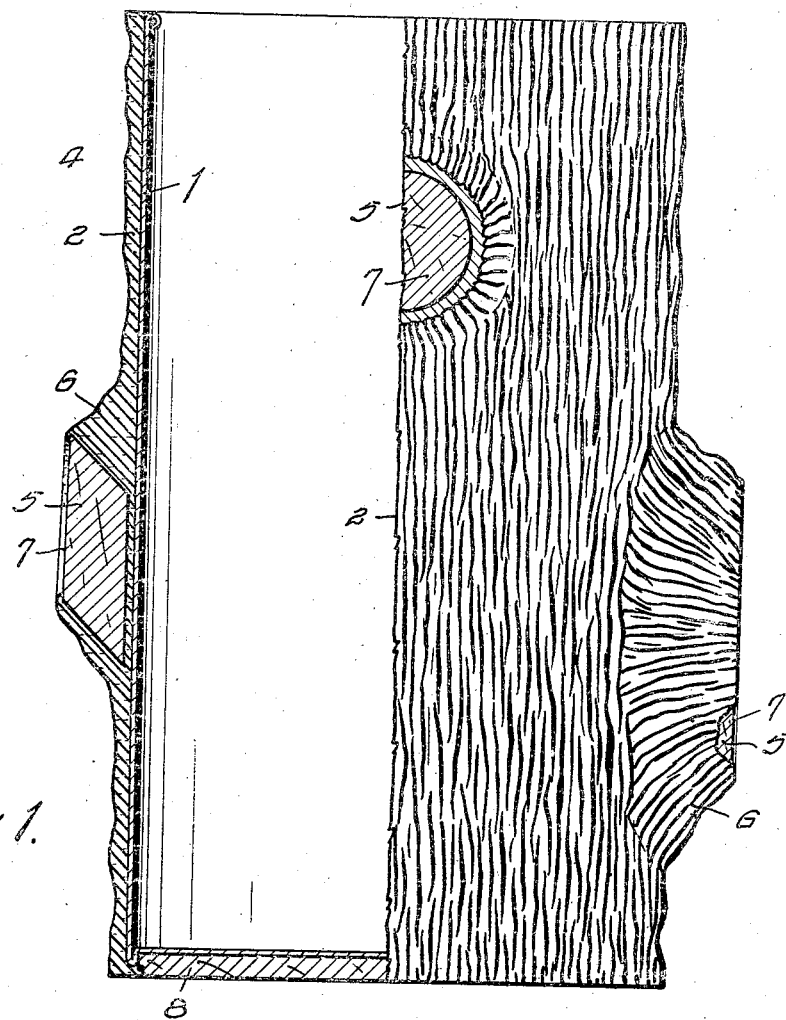
Fig. 1 is a sectional and side elevation of a coated article embodying the features of my invention.

By means of this invention, it is possible to utilize any kind of article, or material as a base form for the composition to be applied to and provided with surface design in imitation of natural tree bark of any class desired, and with predetermined tones of shades of color.

As shown, for illustrative purpose only, there is a container 1 upon the outer surface of which has been applied a coating of composition 2, the exposed surface of which has been formed into natural tree bark design by depressions 3 and elevations 4. The composition bark coating 2 is shown at different places as studded with natural sawed-off limb stumps 5 having a composition coating 6 with depressions and elevations and having their outer ends 7 exposed to view in cross-section.

Figure 2:
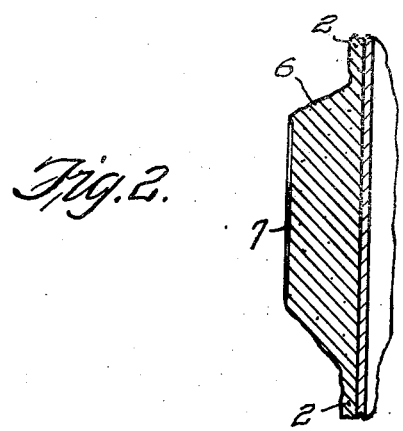
Fig. 2 is a modification of a limb stump formation.

The ends of the limb stumps when formed only of composition material, as shown in Fig. 2, may be painted, if desired, to imitate in color the sawed-off limb end. The base end of the hollow container, as shown, is provided with a piece of wood 8, which is held in position by the composition coating.

The process consists in selecting suitable paper stock, such for instance as old newspapers and grinding same into a more, or less powder like formation and then sterilizing the ground stock by boiling same in water, which softens and separates the stock, making it compact and very pliable. The paper stock after removal from the boiling water is allowed to cool off to a warm temperature.

After the stock has cooled off to a warm temperature, dye of suitable color is dissolved in warm water to provide a tint and it is then mixed with the warm paper stock very quickly, by thorough agitation, and the pulp then runs in the desired shade of color. When surplus water in the pulp shows clear, the pulp is squeezed to remove the surplus water, thus leaving the pulp in a moist state.

After the squeezing operation, the moist pulp is mixed with a thick paste solution of wheat flour and water. The paste solution is added to the pulp and thoroughly mixed therewith, the paste being added until the pulp is doughy.

Next, white fish glue is dissolved in boiling water and the same is added to the mixed paper pulp and thick paste solution. The glue is added and the stock is thoroughly mixed until the desired coating composition formed thereby is slightly sticky.

The article to be surfaced, if hollow, is painted inside in imitation of the wood color desired and allowed to dry.

The surface of the article to be coated is provided with a thin flour and water solution which offers less resistance to spreading the composition on the surface of the article than a non-pasted surface and the composition then adheres more firmly to the surface to which it is applied.

When the pulp has been spread and packed over the surface to which it was applied, the outer surface of the applied pulp is treated with a thin flour and water solution and worked in until the pulp is provided with a smooth surface and of approximately equal thickness.

The outer surface of the pulp is next provided with the desired bark surface imitation by suitably forming the recesses and elevations.

If limb stumps are to be applied to the coated surface, it is accomplished by applying additional coating composition to the first coating at selected places.

After the article has been formed, the composition is rapidly contracted by chilling by being subjected for a period of time to a lower temperature than that in which the composition was applied to the base form. This operation causes the composition to tightly grip the base form and thereafter subjected to a slow rising temperature until the composition has hardened, after which it will not separate from the base form under natural conditions.

After the article has been subjected to a rapid cooling process, the article is dried by heat at the temperature desired. Progressive rising temperatures for drying the composition will give the desired shades of color to the composition bark coating on the base form, and when such shades of color are produced, further rising of drying temperature is ceased. A draft may be directed to one side of the article, and, if so, this side will be of a different shade than the other.

If one side of the article is subjected to a greater temperature than the other, the side exposed to the greater temperature will be darker.

The composition will, when dried, have a variation in surface tones of color and resemble natural bark in every respect. The depressed surfaces will be lighter and the elevated surfaces will be darker in shades of color.

Such composition when dried, may be white shellacked or clear varnished to protect the composition surface.

The many advantages of the herein described invention will readily suggest themselves to those skilled in the art to which it appertains.

What I claim is:

1. The process of decorating a base form in surface imitation and color of natural tree bark, consisting in coating the surface of the base with an adhesive, applying thereto a contracting adhesive composition of ground paper stock, dye, thick flour paste, liquid fish glue, after applying the composition smoothing the surface thereof with a coating of thin flour and water solution, thereafter pressing the composition surface into tree bark formation and design, subjecting the applied composition to a chilling process for initially contracting the composition and finally subjecting the composition to heat for drying the same and effecting thereby surface shades of color in imitation of natural tree bark.

2. The process of decorating a base form, consisting in treating the surface with a thin flour and water solution, applying thereto while still moist a doughy composition of ground paper stock, dye, thick wheat flour paste, and liquid fish glue, subjecting the applied composition surface with a thin coating of thin flour and water solution to smooth the surface under pressure, decoratively forming the surface by pressure while in a doughy state to resemble tree bark, forming composition protuberances on the composition surface to resemble the juncture of tree limbs therewith, chilling the applied and decorated composition and thereafter subjecting the same to progressive rising temperatures and stopping at a predetermined temperature to influence the bark shade desired by producing in the drying process a deeper shade of color to the elevated surfaces over that of the depressed surfaces so as to be in imitation of natural tree bark of the class desired.

3. The process of decorating a base form, which consists in surfacing of the base form with an adhesive, applying a warm doughy coating to the adhesive surface, applying pressure to the doughy coating to press it into uniform thickness, indenting the coating to imitate tree bark, chilling the article to contract the coating, and thereafter subjecting the article to a higher temperature for slowly curing the coating and subjecting the article to air currents and light to bring out colors of shade on the coating in imitation of natural tree bark.

4. The process of decorating a base form in surface imitation and color of natural tree bark, which consists in applying a dyed adhesively treated composition of ground paper material to the base form, coating the surface of the applied composition with a thin adhesive, pressing the composition surface into true bark formation, subjecting the composition on the base form to a chilling process for contracting the composition on the base form and finally subjecting the composition on the base form to heat, light and air currents effecting thereby surface shades of color in imitation of tree bark.

JOHN ERRANTE.